United States Patent [19]

Skaggs

[11] 4,251,089
[45] Feb. 17, 1981

[54] TRACTOR-TRAILER VEHICLE DECOUPLING TOOL

[76] Inventor: Michael G. Skaggs, 5628 W. Monte Vista, Phoenix, Ariz. 85035

[21] Appl. No.: 31,828

[22] Filed: Apr. 20, 1979

[51] Int. Cl.³ ............................................. B62D 53/06
[52] U.S. Cl. .................................................. 280/433
[58] Field of Search .................. 280/433, 434; 74/523; 140/123.5; 254/113, 16, 17; 29/267

[56] References Cited

U.S. PATENT DOCUMENTS

| | | | |
|---|---|---|---|
| 449,808 | 4/1891 | Springer | 140/123.5 |
| 543,290 | 7/1895 | Cardwell | 140/123.5 |
| 3,014,697 | 12/1961 | Goff | 254/113 |
| 3,239,241 | 3/1966 | Worden | 280/434 |
| 3,928,902 | 12/1975 | Seims | 29/267 |

Primary Examiner—John J. Love
Assistant Examiner—Randall A. Schrecengost
Attorney, Agent, or Firm—Herbert E. Haynes, Jr.

[57] ABSTRACT

The fifth wheel assembly by which the trailer is demountably coupled to the tractor of a tractor-trailer vehicle is releasably operated by a special decoupling tool which includes a lever bar having a handle end opposite to a fulcrum end with an elongated hook member pivotably mounted therebetween. To unlock the fifth wheel assembly, to allow decoupling of the tractor and trailer, the hook member is looped over the fifth wheel release handle and the fulcrum end of the lever bar is placed in bearing engagement with a suitable side surface of the vehicle so that movement of the lever bar about its fulcrum end will pull the fifth wheel release handle.

9 Claims, 3 Drawing Figures

TRACTOR-TRAILER VEHICLE DECOUPLING TOOL

BACKGROUND OF THE INVENTION

1. Field of the Invention

This invention relates to tools, and more particularly to a decoupling tool for unlocking a fifth wheel assembly to allow decoupling of a trailer from a tractor.

2. Description of the Prior Art

In large highway transport vehicles of the tractor-trailer type, an assembly commonly referred to as a fifth wheel is mounted on the rear of the tractor for demountably coupling the trailer to the tractor. The fifth wheel assembly is a device which lockably receives a kingpin dependingly carried on the trailer and allows the trailer to pivotably turn relative to the tractor.

The fifth wheel assemblies, although varying somewhat from one manufacturer to another, are all basically the same with regard to their configuration and operation. In general, fifth wheel assemblies will automatically lock the trailer's kingpin in place when the tractor is backed up so as to move the fifth wheel into engagement with the kingpin. Fifth wheel assemblies are provided with a release, or unlocking handle which, in most cases, must be manually pulled so that decoupling of the trailer from the tractor can be accomplished.

As is well known in the art, pulling the release handle to unlock the fifth wheel assembly can be a very dirty job and oftentimes it is a difficult thing to accomplish.

The pivotable operation of the fifth wheel assemblies require that they be covered with grease for proper operation, and they are almost constantly being subjected to mud, slush, snow, road tar and other contaminants due to their physical location adjacent the rear wheels of the tractor. The grease and road contamination, both on the fifth wheel itself and the surrounding areas such as the tractor's wheels and frame and the underside of the trailer, make this a less than ideal place into which the vehicle's operator must reach or crawl in order to pull the fifth wheel release handle.

When both the trailer and the tractor are on a substantially level, or evenly sloping surface, manual pulling of the fifth wheel release handle is usually an easy thing to accomplish. However, if the angular rotation of the trailer about its longitudinal axis differs from the angular rotation of the tractor about its longitudinal axis, the locking mechanism of the fifth wheel assembly can be subjected to binding forces which makes it difficult, if not impossible, for anyone to pull the release handle. Such binding is not an infrequent occurrence, and when it does occur the vehicle's operator has heretofore been required to reposition the tractor and trailer until he achieves a substantially aligned disposition therebetween. Sometimes, properly aligned disposition of the tractor and trailer can be achieved with a single repositioning maneuver, and sometimes the operator will spend considerable time before he achieves the required alignment.

This repositioning of the tractor and trailer to relieve binding of the fifth wheel can be a very time consuming and costly operation, which, in conjunction with the inherently dirty area, can be very frustrating to the operator of the vehicle, and costly to him with regard to ruined clothing.

To the best of my knowledge, no device has been developed or suggested for assisting the operator in such tractor-trailer decoupling operations. Therefore, a need exists for a new and useful decoupling tool which facilitates the unlocking of fifth wheel assemblies.

SUMMARY OF THE INVENTION

In accordance with the present invention, a new and useful decoupling tool is disclosed for assisting an operator in unlocking the fifth wheel assembly by which the trailer is demountably coupled to the tractor of a road transport vehicle, with such unlocking allowing decoupling of the trailer from the tractor. The decoupling tool includes a lever bar having surface engaging means formed on one end thereof with a handle grip on its opposite end. An integral ear or lug extends laterally from the lever bar at a location between the surface engaging and handle grip ends thereof, and an elongated rod has one of its ends pivotably connected to the lug and its opposite end is folded back on itself to form a hook member.

To unlock the fifth wheel, an operator places the hook member of the elongated rod in looped-over engagement with the release handle of the fifth wheel assembly, and positions the lever bar so that the surface engaging end thereof is in bearing engagement with any suitable vertical side surface of the vehicle such as the side wall of one of the rear tires of the tractor, or the vertical side of the trailer. In such a position, the surface engaging end of the lever bar forms a fulcrum and the operator simply grasps the handle grip end and pulls it toward him to pull the release handle of the fifth wheel assembly.

In the preferred embodiment, the surface engaging end of the lever bar is formed by a transverse cylindrical rod which is affixed intermediate its opposite ends to the end of the lever bar. Both of the opposite ends of the lever bar are preferably coated with a rubber-like material, vinyl, or similar material, to provide a relatively high coefficient of friction of the surface engaging end with the vertical surface of the vehicle, and to enhance the operator's grip on the tool.

The decoupling tool of the present invention as described above enables an operator to easily unlock the fifth wheel assembly of a tractor-trailer vehicle regardless of the binding forces applied thereon by misalignment of the trailer relative to the tractor, and such unlocking may be accomplished without requiring the operator to reach or crawl into the immediate area of the fifth wheel assembly.

Accordingly, it is an object of the present invention to provide a new and useful decoupling tool for unlocking the fifth wheel assembly by which the trailer is demountably coupled to the tractor of a road transport vehicle.

Another object of the present invention is to provide a new and useful decoupling tool for unlocking the fifth wheel assembly of a tractor-trailer vehicle with the tool enabling an operator to accomplish the unlocking regardless of binding forces exerted thereon by misalignment of the trailer relative to the tractor.

Another object of the present invention is to provide a new and useful decoupling tool for unlocking the fifth wheel assembly of a tractor-trailer vehicle with the tool enabling an operator to accomplish such unlocking without requiring that he reach or crawl into the immediate area of the fifth wheel assembly.

Another object of the present invention is to provide a new and useful decoupling tool of the above described character which includes a lever bar having a surface engaging end and a handle grip end with an elongated hook rod pivotably extending from an ear laterally extending from the lever bar between the opposite ends thereof.

Still another object of the present invention is to provide a new and useful decoupling tool of the above described type in which the surface engaging end of the lever bar is formed by a transverse cylindrical bar attached intermediate its opposite ends to the end of the lever bar.

Yet another object of the present invention is to provide a new and useful decoupling tool of the above described character in which both of the opposite ends of the lever bar are coated with a rubber-like material.

The foregoing and other objects of the present invention, as well as the invention itself, may be more fully understood from the following description when read in conjunction with the accompanying drawings.

DESCRIPTION OF THE PREFERRED EMBODIMENT

Figure 1:
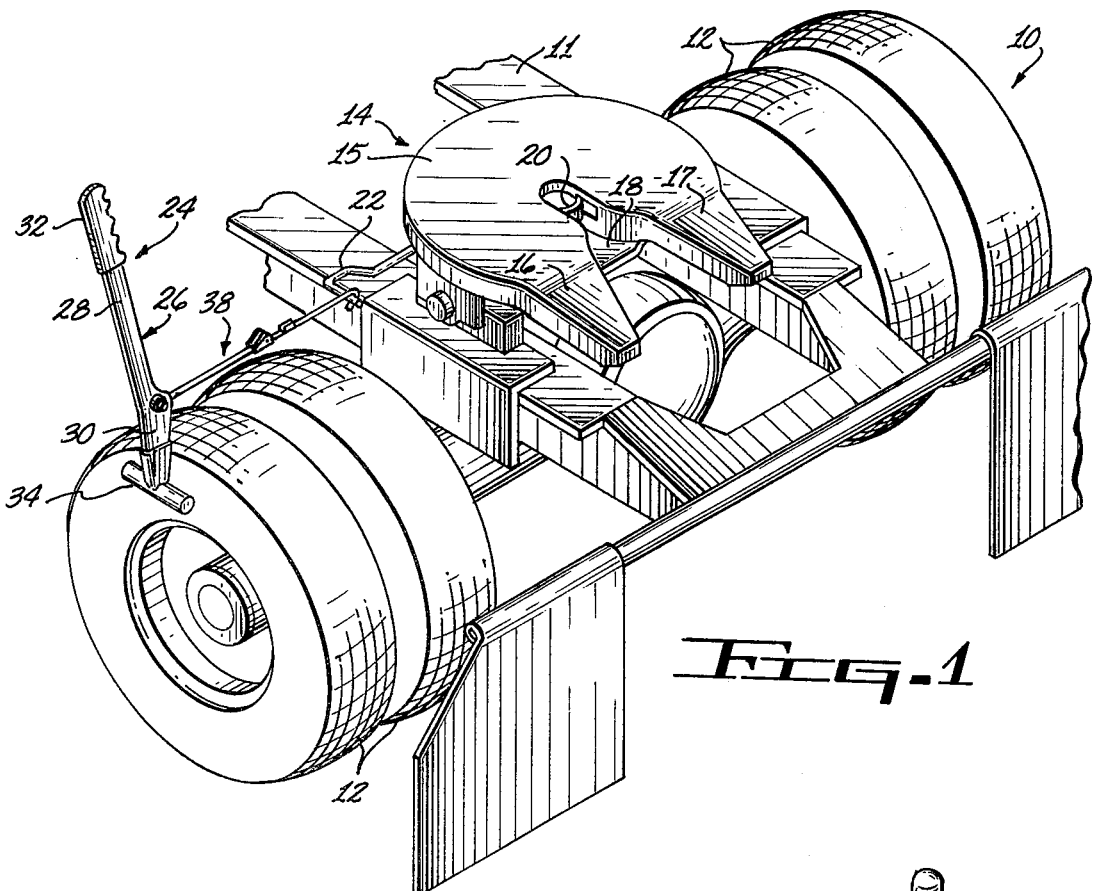
FIG. 1 is a perspective view of a fifth wheel assembly and a fragmentary portion of the tractor on which the fifth wheel is mounted, and showing the decoupling tool of the present invention in its operative position.

Referring more particularly to the drawings, FIG. 1 illustrates a fragmentary portion of the rear of a typical tractor 10 having the usual frame 11 and wheels 12. As is the case in all tractor-trailer road hauling vehicles, the tractor 10 has a fifth wheel assembly, mounted on the frame 11 between the wheels 12, with the fifth wheel assembly being indicated generally by the reference numeral 14.

A fifth wheel assembly, such as the typical one shown in FIG. 1, is, as is known in the art, a device by which a trailer (not shown) is demountably coupled to the tractor 10. The fifth wheel assembly 14 includes the usual plate 15 having a spaced pair of rearwardly extending guide arms or rails 16 and 17 which define a radial channel 18 leading to the center of the plate where a kingpin locking mechanism 20 is located. Connection of a trailer (not shown) to the fifth wheel assembly 14 is accomplished by backing up the tractor 10 toward a parked trailer (not shown) so that the depending kingpin (not shown) provided on the trailer will be lockably gripped by the kingpin locking mechanism 20 of the fifth wheel assembly 14. Such coupling is automatic, i.e., entry of the kingpin (not shown) into the locking mechanism 20 triggers this mechanism to accomplish the locking function. However, unlocking must be accomplished manually and a release handle 22 is provided on the fifth wheel for that purpose. The release handle 22 extends from the fifth wheel assembly 14 toward one of the sets of wheels 12, and when an operator pulls that handle, a suitable linkage (not shown) is operated to unlock the kingpin locking mechanism 20. It is to be understood that fifth wheel assemblies will differ somewhat from one manufacturer to another, but, in general the structures and operation are in accordance with the above description.

As hereinbefore described, operation of the release handle 22 of the fifth wheel assembly 14 is an undesirable task due to grease, dirt, and the like, which are present on and in the vicinity of the fifth wheel, and this task can be very time consuming and difficult due to binding forces produced by misalignment of the trailer and the tractor. Therefore, in accordance with the present invention, a decoupling tool 12, which is indicated in its entirety by the reference numeral 24, is disclosed for assisting an operator in manually operating the release handle 22 of the fifth wheel assembly 14.

Figures 2, 3:
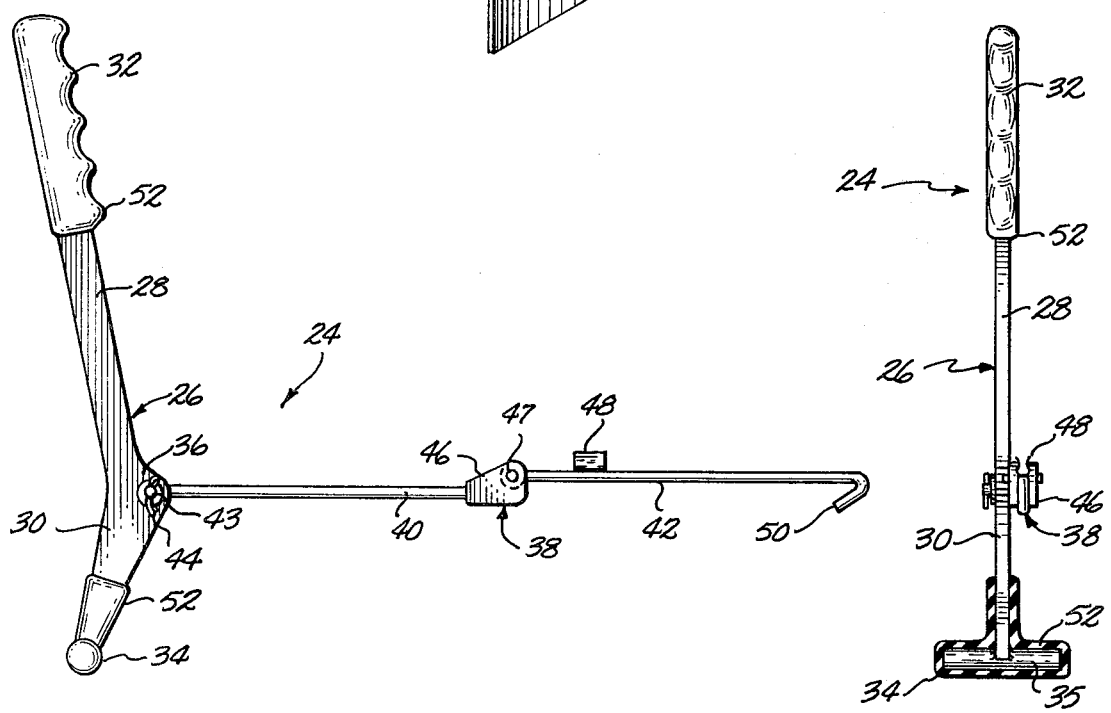
FIG. 2 is a side elevational view of the decoupling tool of the present invention.
FIG. 3 is a front elevational view of the decoupling tool of the present invention.

As seen best in FIGS. 2 and 3, the decoupling tool 24 includes an elongated lever bar 26 which is preferably fabricated of flat stock steel, and is configured with an effort arm portion 28 and an integral relatively short load arm portion 30. The free end of the effort arm portion 28 is formed with a suitable handle grip 32 which is disposed to lie along the longitudinal axis of the effort arm portion. A surface engaging means 34, which is preferably in the form of a cylindrical bar 35, is attached, such as by welding, to the free end of the lever bar 26 so as to be transverse with respect to the longitudinal axis of the load arm 30 of the lever bar.

A laterally extending ear or lug 36 is integrally formed on the lever bar 26 at the junction of the effort arm portion 28 with the load arm portion 30, and an elongated rod 38 is pivotably attached to the lug 36.

The elongated rod 38 may be in the form of a single element component, however, for convenience in storage and carrying, it is preferred that the rod be a folded assembly therefore, the elongated rod 38 is formed with an inner, or first link 40 and an outer, or second link 42.

The first, or inner link 40 of the elongated rod 38 is pivotably attached to the lug 36 of the lever bar 26 and such pivotable attachment may be accomplished in any suitable manner. As shown, the end 43 of the first link 40 may be bent at a right angle with respect to the longitudinal axis of the first link, and that bent end passed through a suitable hole formed through the lug 36 and held therein by a cotter pin 44. The opposite end of the first link 40 has a clevis member 46 fixed thereon with one end of the second link 42 being pivotably attached thereto by a pivot pin 47. A clasp 48 is affixed, such as by welding, on the second link 42 so that when the links 40 and 42 are pivotably moved from their extended position as shown, to their folded position, the clasp 48 on the second link will releasably grip the first link thus holding them in the folded position. The free end of the second link 42 is formed with a hook member 50 thereon which is preferably of V-shaped configuration to provide positive and firm looped-over engagement of the release handle 22 of the fifth wheel assembly 14 as will hereinafter be described in detail.

In the preferred embodiment, the handle grip 32 and the surface engaging means 34 of the lever bar 26 are coated with a suitable material 52 which retards slippage during use of the decoupling tool 10. The material 52 may be rubber, neoprene, plastic or any such material which provides a high coefficient of friction with any element or elements with which it is brought into bearing engagement.

To assist an operator in releasably actuating the release handle 22 of the fifth wheel assembly 14, the hook member 50 of the elongated rod 38 is placed in looped-over engagement with the release handle 22, and the surface engaging means 34 is placed in bearing engagement with a vertical surface of the vehicle, as shown in FIG. 1. In most instances, the vertical surface will be the outwardly facing side wall of one of the vehicle's wheels 12. However, in some situations it may be more convenient to invert the decoupling tool 24 so that the surface engaging means is at the top for placement in bearing engagement with the vertical side surface of the trailer (not shown).

In any event, the tool 10 positioned as described above is grasped by an operator and pulled toward him to move the lever bar 26 in an arc about the surface engaging means 34. Thus, the decoupling tool 24 is a second class lever which when operated as described above, provides considerable mechanical advantage, and this mechanical advantage will actuate even the most severely bound up fifth wheel assemblies.

It will be noted that an angular relationship in the range of from 15° to 25°, and preferably 20°, is provided between the effort arm portion 28 and the load arm portion 30 of the lever bar 26. This angular relationship provides clearance between the side of the tractor-trailer vehicle and the lever bar. In some instances, the lack of such clearance would make the tool difficult, if not impossible to use.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. The combination of a fifth wheel of the type used for demountably coupling the trailer to the tractor of a tractor-trailer vehicle and a tool for unlocking the fifth wheel to allow decoupling of the tractor and trailer, the combination comprising:
   (a) a fifth wheel carried on the frame of the tractor between the rear wheels thereof, said fifth wheel adapted for lockably coupling the trailer to the tractor;
   (b) a release handle on said fifth wheel and extending laterally therefrom transverse to the longitudinal axis of the frame of said tractor, said release handle formed in a hook-shaped configuration and upon being pulled will unlock said fifth wheel to allow decoupling of the trailer from the tractor; and
   (c) a decoupling tool for use in unlocking said fifth wheel, said decoupling tool comprising,
   I. an elongated lever bar,
   II. a handle grip on one end of said lever bar,
   III. a surface engaging means on the opposite end of said lever bar for forming a fulcrum about which said lever bar is movable in an arc when said surface engaging means is placed in bearing engagement with a side surface of the tractor-trailer vehicle,
   IV. an elongated rod pivotably mounted on one end thereof to said lever bar intermediate said handle grip and said surface engaging means, and
   V. hook means formed on the other end of said rod for looped over engagement of said release handle so that upon movement of said lever bar said release handle will be pulled for unlocking of said fifth wheel.

2. The combination of claim 1 wherein said surface engaging means comprises a cylindrical bar attached intermediate its opposite ends to said lever bar so as to be transverse with respect to the longitudinal axis of said lever bar.

3. The combination of claim 1 and further comprising a coating of rubber-like material on said handle grip and on said surface engaging means to enhance the frictional gripping thereof.

4. The combination of claim 1 wherein said lever bar includes a lug extending laterally from said lever bar with said elongated rod being pivotably attached to said lug.

5. The combination of claim 4 and further comprising said lug being disposed along the length of said lever bar so as to divide said lever bar into an effort arm portion and a relatively shorter load arm portion, said lever bar being configured to provide an angular relationship between the effort arm portion and the load arm portion with the angular relationship being in the range of between 15° and 25°.

6. The combination of claim 5 wherein the angular relationship between the effort arm portion and the load arm portion of said lever bar is 20°.

7. The combination of claim 1 wherein said elongated rod is foldable.

8. The combination of claim 1 wherein said elongated rod comprises:
   (a) a first link having one of its ends pivotably attached to said lever bar; and
   (b) a second link pivotably coupled on one of its ends to the other end of said first link, said second link having said hook means formed on its other end.

9. The combination of claim 1 wherein said hook means is of V-shaped configuration.

* * * * *